Sept. 8, 1925.
H. REICHEL
SHINGLE CUTTING MACHINE
Filed Aug. 24, 1923
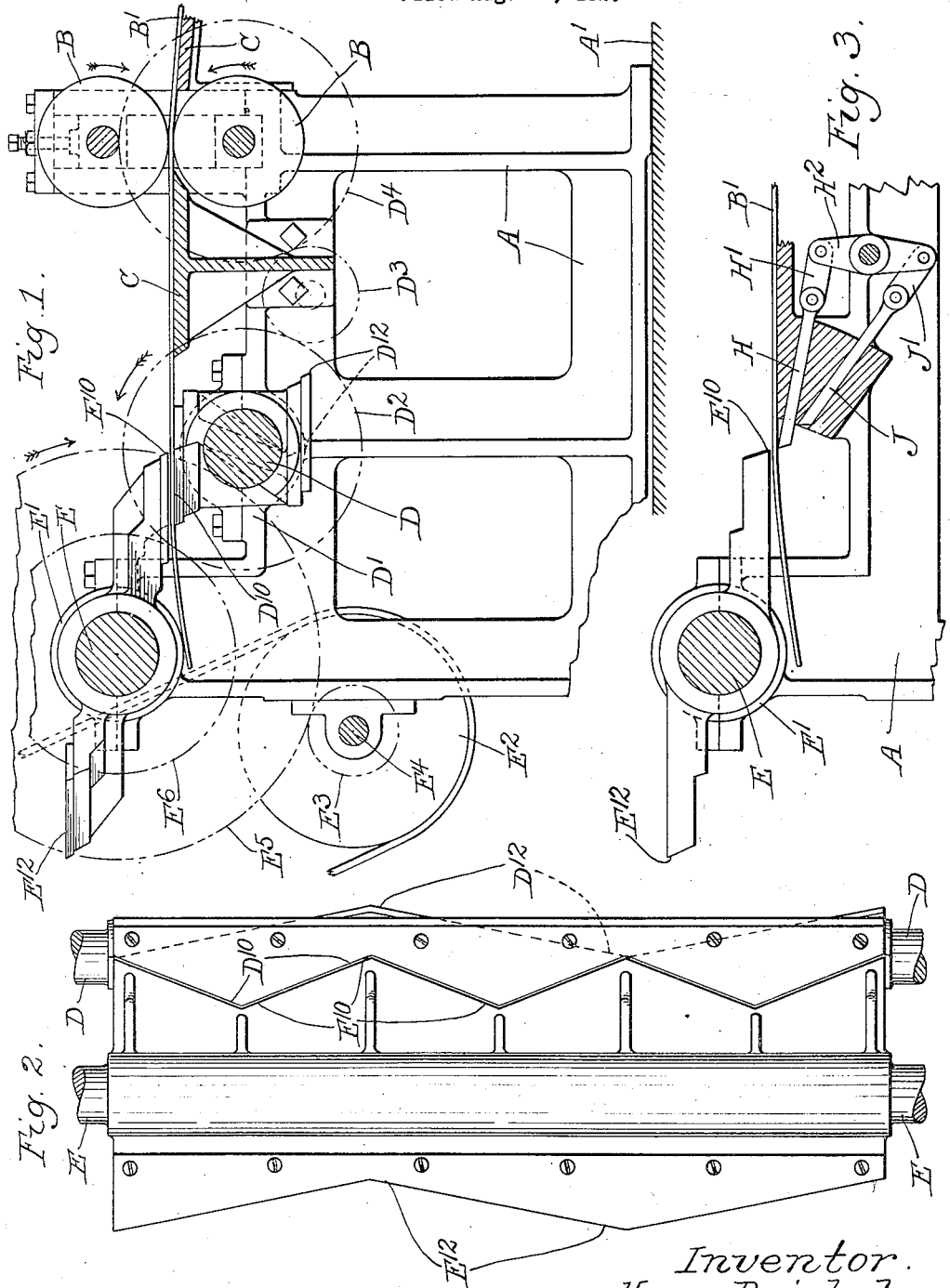
Inventor.
Hugo Reichel
by Parker & Carter
Attorneys.

Patented Sept. 8, 1925.

1,552,447

UNITED STATES PATENT OFFICE.

HUGO REICHEL, OF CHICAGO, ILLINOIS.

SHINGLE-CUTTING MACHINE.

Application filed August 24, 1923. Serial No. 659,056.

*To all whom it may concern:*

Be it known that I, HUGO REICHEL, a citizen of the United States, residing at Chicago, in the county of Cook and State of Illinois, have invented a certain new and useful Improvement in Shingle-Cutting Machines, of which the following is a specification.

My invention relates to a shingle cutting device and has for object to provide a cutter adapted to cut from a strip of material shingles or other similar objects, wherein opposed sides differ in shape. Other objects will appear from time to time in the course of the specification and claims.

I illustrate my invention more or less diagrammatically in the accompanying drawings wherein:—

Figure 1 is a side elevation of my device with parts in section;

Figure 2 is a partial plan view; and

Figure 3 is a section through a variant form.

Like parts are illustrated by like characters throughout the specification and drawings.

A is any suitable frame supported on a base $A^1$.

B, B are feeding rollers adapted to feed a roll or strip of shingle forming material $B^1$.

C is any suitable supporting table over which the strip of material passes, and which serves to align the strip with the cutters.

D is a cutter shaft mounted in any suitable bearings $D^1$ on the frame A.

E is a second cutter shaft mounted in any suitable bearings $E^1$ on the frame A. It is driven from a power source not herein shown, through the pulley $E^2$ on the pulley shaft $E^4$ and the pinion $E^3$ and the gear $E^5$ on the shaft E. While I do not limit myself to the specific driving means herein described, and illustrated, I find it satisfactory thus to drive the shaft E and to drive the shaft D from the shaft E by means of the gears $E^6$ and $D^2$ which are of the same diameter. The feed rolls may be driven from the shaft D by means of the gear $D^2$, the idler $D^3$ and the gear $D^4$.

Each cutter shaft is provided with two cutting edges respectively indicated as $D^{10}$, $D^{12}$ and $E^{10}$, $E^{12}$, it being understood that $D^{10}$ and $E^{10}$ are complementary, while $D^{12}$ and $E^{12}$ are complementary, the two complementary pairs differing from each other. The two shafts D and E rotate at the same rate, but it will be noted that the cutting edges $E^{10}$, $E^{12}$ are illustrated as substantially farther from the center of the shaft E than are the cutting edges $D^{10}$, $D^{12}$ from the center of the shaft D. Therefore, while $D^{10}$, $E^{10}$ and $D^{12}$, $E^{12}$ meet at the same point on each revolution, they pass that point at different speeds, $E^{10}$ or $E^{12}$ moving sufficiently faster than $D^{10}$ or $D^{12}$ to shear off any material which may be interposed between them. The said rollers are geared to feed a length of material at each half revolution of the cutting shafts just sufficient to form a unit of the shingle or other article being produced.

In Figure 3 I illustrate a variant device in which a slide H actuated by the link $H^1$ from the crank $H^2$ is pushed forward to meet the cutting edge $E^{10}$, whereas a second slide J actuated, for example through a link $J^1$, is pushed forward to meet the cutting edge $E^{12}$, H being meanwhile drawn back out of position, the two slides being reciprocated in synchronized relation with the rotation of the shaft E.

It will be realized that while I have illustrated a working device, and one which is actually being operated commercially, I do not wish to limit myself to the specific form being herein shown. Many changes might be made in the size, shape, number and disposition of parts without departing from the spirit of my invention.

The use and operation of my invention are as follows:

In shingling roofs with shingles cut from the various compositions now used for shingle manufacture, it is often advantageous to employ shingles of irregular shape, for example, for forming interlocking shingles which stay in position with a minimum of nailing or other fastening.

When shingles of irregular shape are used the opposite sides of the shingles are, of course, different. In cutting a shingle from a strip of material, it is desirable, in the first place to cut it without any waste material, the side of one shingle preferably interlocking with or fitting into the side of the shingle formed next to it in the roll or strip from which the shingles are cut. Unless the side of the shingle is straight, it is necessary to form such shingles with alternate cuts by knives or cutters of differing formation.

In the particular form of my invention herein illustrated, I show a rotary cutter having two diametrically opposed cutting blades of different contour. Since as the cutter is rotated, the blades alternate, the objects cut will be given the impression of one blade on one side and one blade on the other. When my cutter is used to cut shingles where the opposed sides are complementary, namely, where the left side of one shingle fits into the right side of the next, I form the shingles by employing a cutter with complementary blades. As the cutter is rotated, one blade forms the second side of the completed shingle and at the same time shears it off and forms the first side of the succeeding shingle. There is, therefore, no loss of material. As the above described rotary cutter, which I may call the primary cutter, rotates it must have presented to it secondary cutter blades or bases. In the form herein shown E is the primary cutter shaft and the blades $E^{10}$, $E^{12}$ are the primary blades. To them as they pass the cutting point I oppose the secondary cutting blades or bases which in Figure 1 are shown as the rotary blades $D^{10}$, $D^{12}$ and in Figure 3 are shown as the reciprocating slides H and J. Where I use a rotary cutter, it will be understood that the secondary cutter blades or bases must move very substantially slower than the primary blades and I get this result by very substantially reducing the distance of the secondary blades from their center of rotation as compared to the distance of the primary blades from their center of rotation. I then rotate both shafts at the same speed and as each opposed pair of cutters meet, the primary cutter is travelling so much faster than the secondary cutter that any material interposed between them is sheared off.

It will of course be understood that while I have described the use of my device for use with shingles, that I do not wish to be limited to such use and with minor changes in design and any desired variation in size my device may be adapted to a wide variety of objects where it is desired to cut off portions of a strip of material to form units having differently formed sides.

Also, while I have described my device as used for shearing shingles where the opposed sides of the shingle are complementary, it may be used to shear off sections in which the opposite sides are not complementary, being entirely different. In that case each finished article is separated from the next by a blank of the waste material. My device can of course be used for cutting straight sided objects, if so desired.

I claim:

1. In a device for cutting from a relatively continuous strip of material articles having opposed edges of different contour, a feeding means for feeding said material forward, a rotary cutting base over which such material passes, said cutting base being provided with a plurality of cutting blocks of different contour, a rotary knife adjacent said rotary base, a plurality of cutting edges upon said knife shaped to conform to said cutting blocks, and means for rotating said knife and said base in opposite directions of rotation, to bring the corresponding cutting bases and cutting edges into opposition at a predetermined point, the radius of said cutting edges being substantially greater than the radius of said cutting blocks.

2. In a device for cutting from a relatively continuous strip of material articles having opposed edges of different contour, a feeding means for feeding said material forward, a rotary cutting base over which such material passes, said cutting base being provided with a plurality of cutting blocks of different contour, a rotary knife adjacent said rotary base, a plurality of cutting edges upon said knife shaped to conform to said cutting blocks, and means for rotating said knife and said base in opposite directions of rotation, to bring the corresponding cutting bases and cutting edges into opposition at a predetermined point, and a supporting element for the material being fed adapted to align it horizontally with the point of contact of the cutting blocks and the cutting edges.

3. In a device for cutting from a relatively continuous strip of material articles having opposed edges of different contour, feeding means for feeding said material forward, a rotary cutting base over which such material passes, said cutting base being provided with a plurality of transverse cutting edges of different contour, a rotary knife positioned adjacent said base, a plurality of cutting edges upon said knife, each such cutting edge formed to conform to one of the cutting edges upon said rotary cutting base, and means for rotating said knife and said base in opposite directions of rotation, and at the same rotational rate, to bring the corresponding cutting edges of knife and base into opposition at a predetermined point.

4. In a device for cutting from a relatively continuous strip of material articles having opposed edges of different contour, feeding means for feeding said material forward, a rotary cutting base over which such material passes, said cutting base being provided with a plurality of transverse cutting edges of different contour, a rotary knife positioned adjacent said base, a plurality of cutting edges upon said knife, each such cutting edge formed to conform to one of the cutting edges upon said rotary cutting base, and means for rotating said knife and said base in opposite directions of rotation, and at the same rotational rate, to bring the corresponding cutting edges of knife and base into opposition at a predetermined point, the radius of the cutting edges of said rotary knife being substantially greater than the radius of the cutting edges of said rotary base.

Signed at Chicago, county of Cook and State of Illinois, this 22nd day of August 1923.

HUGO REICHEL.